US008365060B2

(12) United States Patent
Wang et al.

(10) Patent No.: US 8,365,060 B2
(45) Date of Patent: Jan. 29, 2013

(54) SYSTEM AND METHOD FOR INDICATING TRACK RELATIONSHIPS IN MEDIA FILES

(75) Inventors: Ye-Kui Wang, Tampere (FI); Miska Hannuksela, Ruutana (FI); Imed Bouazizi, Tampere (FI)

(73) Assignee: Nokia Corporation, Espoo (FI)

( * ) Notice: Subject to any disclaimer, the term of this patent is extended or adjusted under 35 U.S.C. 154(b) by 1189 days.

(21) Appl. No.: 11/844,300

(22) Filed: Aug. 23, 2007

(65) Prior Publication Data

US 2008/0052306 A1 Feb. 28, 2008

Related U.S. Application Data

(60) Provisional application No. 60/840,209, filed on Aug. 24, 2006.

(51) Int. Cl.
G06F 17/00 (2006.01)
(52) U.S. Cl. .......................................................... 715/202
(58) Field of Classification Search .................. 715/201, 715/202
See application file for complete search history.

(56) References Cited

U.S. PATENT DOCUMENTS

| 5,553,221 | A  | * | 9/1996  | Reimer et al. ............... 715/720 |
| 5,752,029 | A  | * | 5/1998  | Wissner .................................. 1/1 |
| 5,754,851 | A  | * | 5/1998  | Wissner .................................. 1/1 |
| 6,181,651 | B1 | * | 1/2001  | Kishimoto et al. ......... 369/44.28 |
| 7,444,069 | B1 | * | 10/2008 | Bernsley ...................... 386/239 |
| 7,711,718 | B2 | * | 5/2010  | Hannuksela .................. 707/695 |
| 7,725,812 | B1 | * | 5/2010  | Balkus et al. ................. 715/202 |
| 7,778,526 | B2 | * | 8/2010  | Zacek ............................ 386/111 |
| 2002/0009151 | A1 | * | 1/2002 | Gentric .................... 375/240.26 |
| 2002/0075768 | A1 | * | 6/2002 | Miyamoto et al. ......... 369/44.13 |
| 2002/0075770 | A1 | * | 6/2002 | Miyamoto et al. ......... 369/44.13 |
| 2003/0163781 | A1 | * | 8/2003 | Visharam et al. ............. 715/500 |
| 2003/0188182 | A1 | * | 10/2003 | Sato et al. ...................... 713/193 |
| 2004/0143672 | A1 | * | 7/2004 | Padmanabham et al. ..... 709/231 |
| 2004/0146284 | A1 | * | 7/2004 | Kawate et al. .................. 386/96 |
| 2005/0055639 | A1 | * | 3/2005 | Fogg ............................. 715/535 |
| 2005/0060386 | A1 | * | 3/2005 | Seo ............................... 709/219 |

(Continued)

FOREIGN PATENT DOCUMENTS

WO WO 03/098475 11/2003
WO WO 2004/056118 7/2004

(Continued)

OTHER PUBLICATIONS

Houchin et al., File Format Technology in JPEG 2000 Enables Flexible Use of Still and Motion Sequences, Google 2002, pp. 131-144.*

(Continued)

*Primary Examiner* — Cong-Lac Huynh
(74) *Attorney, Agent, or Firm* — Alston & Bird LLP

(57) ABSTRACT

A system and method for signaling and indicating track relationship information in media files provides a mechanism for signaling the information of layered track groups and the information of multiple description coding (MDC) track groups, as well as a mechanism for signaling track relationship information in an efficient way. In local playback or unicast streaming applications, to select an independently decodable track for a certain media type, the information of alternate track groups is first found via the track relation box, and one track is selected from an alternate track group for the media type. If stream switching is desired, the switching track group information is found via the track relation box. In multicast applications with scalable or MDC streams, the tracks in a layered or MDC group are found via the track relation box and selected among all the layered or MDC groups.

74 Claims, 3 Drawing Sheets

U.S. PATENT DOCUMENTS

| | | | |
|---|---|---|---|
| 2005/0086582 A1* | 4/2005 | Frojdh et al. | 715/501.1 |
| 2005/0210356 A1 | 9/2005 | Chou et al. | |
| 2005/0219974 A1* | 10/2005 | Van Den Enden et al. | 369/47.21 |
| 2005/0254575 A1* | 11/2005 | Hannuksela et al. | 375/240.1 |
| 2005/0281163 A1* | 12/2005 | Saeki et al. | 369/53.16 |
| 2006/0087759 A1* | 4/2006 | Evans | 360/48 |
| 2006/0136341 A1* | 6/2006 | Wajs | 705/57 |
| 2006/0150053 A1* | 7/2006 | van der Schaar et al. | 714/752 |
| 2006/0233247 A1* | 10/2006 | Visharam et al. | 375/240.12 |
| 2006/0256867 A1* | 11/2006 | Turaga et al. | 375/240.16 |
| 2007/0186005 A1* | 8/2007 | Setlur et al. | 709/231 |
| 2007/0201832 A1* | 8/2007 | Date et al. | 386/95 |
| 2007/0244929 A1* | 10/2007 | Huang et al. | 707/104.1 |
| 2007/0276954 A1* | 11/2007 | Chan et al. | 709/231 |
| 2008/0056663 A1* | 3/2008 | Tsujii et al. | 386/52 |
| 2009/0119594 A1* | 5/2009 | Hannuksela | 715/723 |
| 2009/0185619 A1* | 7/2009 | Taleb et al. | 375/240.02 |
| 2009/0313293 A1* | 12/2009 | Setlur et al. | 707/102 |
| 2010/0064049 A1* | 3/2010 | Magharei et al. | 709/229 |

FOREIGN PATENT DOCUMENTS

| | | |
|---|---|---|
| WO | WO 2005/086625 | 9/2005 |
| WO | WO 2007/042916 | 4/2007 |

OTHER PUBLICATIONS

Amon et al., File Format for Scalable Video Coding, IEEE 2007, pp. 1174-1185.*

Furini, Beyond Passive Audiobook: How Digital Audiobooks Get Interactive, IEEE 2007, pp. 971-975.*

Amon et al., File Format for Scalable Video Coding, IEEE Sep. 2007, pp. 1174-1185.*

International Search Report for PCT Application No. PCT/IB2007/053324.

Examiner's Report for Australian Application No. 2007287222 dated Jul. 21, 2010.

Office Action for Korean Application No. 10-2009-7005944 dated Jul. 28, 2010 (including English translation).

Office Action for Kazakhstan Application No. 2009/1544.1, dated May 20, 2011.

English translation of Office Action for Kazakhstan Application No. 2009/1544.1, dated May 20, 2011.

Office Action in Canadian Patent Application No. 2,661,578, dated Oct. 27, 2011.

Singer et al., "MPEG-21 File Format white paper." Apr. 2006, International Organization for Standardization ISO/IEC JTC 1/SC 291WG 11, N7925, Montreaux (http://mpeg.chiariglione.org/technologies/mpeg-21/mp21-ff/index.htm).

Luby, M., et al.; "Asynchronous Layered Coding (ALC) Protocol Instantiation"; Network Working Group; Request for Comments: 3450; Dec. 2002.

Luby, M., et al.; "Layered Coding Transport (LCT) Building Block"; Network Working Group; Request for Comments: 3451; Dec. 2002.

Paila, T., et al.; "Flute—File Delivery over Unidirectional Transport"; Network Working Group; Request for Comments: 3926; Oct. 2004.

Reichel, J., et al.; "Joint Scalable Video Model JSVM-6"; Joint Video Team (JVT) of ISO/IEC MPEG & ITU-T VCEG; (ISO/IEC JTC1/SC29/WG11 and ITU-T SG16 Q. 6); 19$^{th}$ meeting; Geneva, Switzerland; Mar.-Apr. 2006.

Schulzrinne, H., et al.; "RTP: A Transport Protocol for Real-Time Applications"; Network Working Group; Request for Comments: 3550; Jul. 2003.

Singer, D., et al.; "MPEG-21 File Format white paper"; International Organization for Standardization; Coding of Moving Pictures and Audio; ISO/IEC JTC 1/SC 29/WG 11 N7925; Apr. 2006; Montreux, Switzerland; 2 pages.

Vetro, A., et al.; "Joint Multiview Video Model (JMVM) 1.0"; Joint Video Team (JVT) of ISO/IEC MPEG & ITU-T VCEG (ISO/IEC JTC1/SC29/WG11 and ITU-T SG16 Q.6); 20$^{th}$ meeting; Klagenfurt, Austria; Jul. 2006.

Wang, Y., et al.; "Multiple Description Coding for Video Delivery"; Proceedings of the IEEE; vol. 93; Issue 1; Jan. 2005; pp. 57-70.

3GPP TS 26.244 V9.2.0 (Jun. 2010); 3rd Generation Partnership Project; Technical Specification Group Services and System Aspects; Transparent end-to-end packet switched streaming service (PSS); 3GPP file format (3GP) (Release 9).

International Standard ISO/IEC 14496-12; "Information Technology—Coding of audio-visual objects—Part 12: ISO base media file format"; Oct. 2008.

International Standard ISO/IEC 14496-14; "Information Technology—Coding of audio-visual objects—Part 14: MP4 file format"; Nov. 2003.

International Standard ISO/IEC 14496-15; "Information Technology—Coding of audio-visual objects—Part 15: Advanced Video Coding (AVC) file format"; Apr. 2004.

First Office Action for Chinese Patent Application No. 200780035257.9, issued Jun. 10, 2010.

Extended European Search Report for European Patent Application No. 07 826 068.4, mailed Dec. 13, 2010.

Communication for European Patent Application No. 07 826 068.4, dated Feb. 20, 2012.

Communication for Philippines Patent Application No. 12009500456, mailed Nov. 29, 2011.

Office Action for Russian Patent Application No. 2009109847/09(013343), dated Nov. 5, 2009.

Communication for Vietnamese Patent Application No. 1-2009-00583, dated Dec. 8, 2009.

Office Action for Chinese Application No. 200780035257.9 dated Jul. 11, 2012.

Office Action for Chinese Patent Application No. 200780035257.9, dated Nov. 2, 2011.

English translation of Office Action for Chinese Patent Application No. 200780035257.9, dated Nov. 2, 2011.

* cited by examiner

SYSTEM AND METHOD FOR INDICATING TRACK RELATIONSHIPS IN MEDIA FILES

FIELD OF THE INVENTION

The present invention relates generally to the storage of coded media files. More particularly, the present invention relates to the storage of coded media data in files for local playback or transmission.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Multimedia applications include services such as local playback, streaming or on-demand, conversational and broadcast/multicast services. Technologies involved in multimedia applications include, among others, media coding, storage and transmission. Different standards have been specified for different technologies.

Scalable coding produces scalable media streams, where a stream can be coded in multiple layers. In scalable coding, each layer, together with the required lower layers, is one representation of the media sequence at a certain spatial resolution, temporal resolution, certain quality level or some combination of the three. A portion of a scalable stream can be extracted and decoded at a desired spatial resolution, temporal resolution, certain quality level or some combination thereof. A scalable stream contains a non-scalable base layer and one or more enhancement layers. An enhancement layer may enhance the temporal resolution (i.e., the frame rate), the spatial resolution, or simply the quality of the video content represented by a lower layer or part thereof. In some cases, data in an enhancement layer can be truncated after a certain location, or even at arbitrary positions, where each truncation position may include additional data representing increasingly enhanced visual quality.

SVC is an example scalable coding of video. The latest draft of the SVC standard is described in JVT-S202, "Joint Scalable Video Model JSVM-6: Joint Draft 6 with proposed changes," 19th Meeting, Geneva, Switzerland, April 2006, incorporated herein by reference in its entirety.

In multi-view video coding (MVC), video sequences output from different cameras, each corresponding to a view, are encoded into one bitstream. After decoding, to display a certain view, the decoded pictures belonging to that view are displayed. The latest draft of the MVC standard is described in JVT-T208, "Joint multiview video model (JMVM 1.0)," 20th JVT meeting, Klagenfurt, Austria, July 2006, incorporated herein by reference in its entirety.

In multiple description coding (MDC), an input media sequence is encoded into more than sub-streams, each of which is referred to as a description. Each description is independently decodable and represents a certain media quality. However, based on the decoding of one or more than one description, the additional decoding of another description can result in an improved media quality. MDC is discussed in detail in Y. Wang, A. Reibman, and S. Lin, "Multiple description coding for video delivery," Proceedings of the IEEE, vol. 93, no. 1, January 2005, incorporated herein by reference in its entirety.

The file format is an important element in the chain of multimedia content production, manipulation, transmission and consumption. There is a difference between the coding format and the file format. The coding format relates to the action of a specific coding algorithm that codes the content information into a bitstream. In contrast, the file format comprises a system of organizing the generated bitstream in such way that it can be accessed for local decoding and playback, transferred as a file, or streamed, all utilizing a variety of storage and transport architectures. Further, the file format can facilitate the interchange and editing of the media. For example, many streaming applications require a pre-encoded bitstream on a server to be accompanied by metadata, stored in the "hint-tracks," that assists the server to stream the video to the client. Examples information that can be included in hint-track metadata include timing information, indications of synchronization points, and packetization hints. This information is used to reduce the operational load of the server and to maximize the end-user experience.

Available media file format standards include the ISO file format (ISO/IEC 14496-12), the MPEG-4 file format (ISO/IEC 14496-14), the AVC file format (ISO/IEC 14496-15) and the 3GPP file format (3GPP TS 26.244). There is also a project in MPEG for development of the SVC file format, which will become an amendment to AVC file format. In a parallel effort, MPEG is defining a hint track format for FLUTE (file delivery over unidirectional transport) sessions.

The ISO file format is the base for the derivation of all the other above-referenced file formats. All of these file formats, including the ISO file format, are referred to as the ISO family of file formats. According to the ISO family of file formats, each file, hierarchically structured, contains exactly one movie box which may contain one or more tracks, and each track resides in one track box. It is possible for more than one track to store information of a certain media type. A subset of these tracks may form an alternate track group, wherein each track is independently decodable and can be selected for playback or transmission, and wherein only track in an alternate should be selected for playback or transmission.

All tracks in an alternate group are candidates for media selection. However, it may not make sense to switch between some of those tracks during a session. For example, one may allow switching between video tracks at different bit rates and keep the frame size, but not allow switching between tracks of different frame sizes. In the same manner one may want to the enable selection (but not switching) between tracks of different video codecs or different audio languages. The distinction between tracks for selection and switching is addressed by introducing a sub-group structure referred to as switch groups. All tracks in an alternate group are candidates for media selection, whereas, tracks in a switch (sub)group are also available for switching during a session. Different switch groups represent different operation points, such as different frame size, high/low quality, etc.

The ISO file format supports hint tracks that provide cookbook instructions for encapsulating data to transmission packets and transmission of the formed packets according to certain timestamps. The hint track mechanism can be used by servers, such as streaming servers, for real-time audio-visual data. The cookbook instructions may contain guidance for packet header construction and include packet payload construction. In the packet payload construction, data residing in other tracks or items may be referenced, i.e. it is indicated by a reference which piece of data in a particular track or item is instructed to be copied into a packet during the packet construction process. The hint track mechanism is extensible to any transport protocols and, currently, the hint track format for Real-Time Transport Protocol (RTP, IETF RFC 3550 (www.ietf.org/rfc/rfc3550.txt) (incorporated herein by reference in its entirety)) is specified and the hint track format for file delivery protocols over uni-directional channels, such as FLUTE (IETF RFC 3926 (www.ietf.org/rfc/rfc3926.txt) (incorporated herein by reference in its entirety)) and ALC (IETF RFC 3450 (www.ietf.org/rfc/rfc3450.txt) (incorporated herein by reference in its entirety)) is undergoing the standardization process.

As discussed above, the ISO family of file formats supports hint tracks. The draft SVC file format supports a data structure referred to as an extractor. An extractor is similar to a hint sample but is not specific to any transport protocol. An extractor references to a subset of the data of a media sample, where the referenced data corresponds to the data needed in that sample for the decoding and playback of a certain scalable layer.

For multicast applications with scalable media streams, information of a scalable stream may be stored in different tracks, with each track corresponding to a scalable layer or a number of contiguous layers. These tracks can be hint tracks as well as extractor tracks. As discussed herein, an "extractor track" refers to a track that contains extractors and possibly also non-extractor samples, e.g., media data units. This way, if layered multicast is applied, the sub-stream in each track can be sent in its own Real-time Transport Protocol (RTP) session, and a receiver subscribes to a number of the RTP sessions containing the desired scalable layer and the lower required layers. These tracks are referred to as a layered track group. Tracks in a layered track group together form an independently decodable scalable stream, while decoding of the sub-stream corresponding to each individual track in a layered track group may depend on sub-streams corresponding to other tracks. The above also applies to multi-view video streams, where each view is considered as a scalable layer. Similarly, for a MDC stream, information of each sub-stream or description may also be stored in its own track. These tracks corresponding to all of the descriptions of a MDC stream are referred to as a MDC track group.

FLUTE, which is discussed at IETF Request for Comments (RFC) No. 3926 (www.ietf.org/rfc/rfc3926.txt) and is incorporated herein by reference in its entirety, has been widely adopted as the file delivery protocol for multicast and broadcast applications. FLUTE is based on the asynchronous layered coding (ALC) protocol, which is discussed in the IETF RFC 3450 (www.ietf/org/rfc/rfc3450.txt), and the layered coding transport (LCT) protocol, which is discussed in the IETF RFC 3451 (www.ietf.org/rfc/rfc3451.txt). FLUTE inherits all of the functionalities defined in the ALC and LCT protocols, both of which are incorporated herein by reference in their entireties. LCT defines the notion of LCT channels to allow for massive scalability. The LCT scalability has been designed based on the Receiver-driven Layered Multicast (RLM) principle, where receivers are responsible of implementing an appropriate congestion control algorithm based on the adding and removing of layers of the delivered data. The sender sends the data into different layers, with each being addressed to a different multicast group.

In LCT, one or multiple channels may be used for the delivery of the files of a FLUTE session. A great flexibility is given to the FLUTE sender with regard to how the data is partitioned among the LCT channels. A common use case is to send the same data on all different LCT channels but at different bitrates. Additionally, the FLUTE sender may act intelligently to enable receivers to acquire all files of the FLUTE session by joining all channels for a shorter time than is normally required with one channel. In such a case, the data sent over each channel complements the data of other channels.

Information about the LCT channels of a FLUTE session, as well as how data is split between the different channels, is currently being defined in the FLUTE hint track specification. Such information will help the FLUTE server to select the right channels and merge them into the appropriate FLUTE session according to the target application. If a set of FLUTE hint tracks are independent from each other and only one of those hint tracks is intended to be processed during a FLUTE session, then they belong to an alternate track group, and at least a subset of them belong to one switching track group. If a set of FLUTE hint tracks are complementary to each other, they belong to a layered track group.

Current file format designs do not support the signaling of layered or MDC track groups. In addition, the current signaling of alternate or switching track groups is to include an alternate or switching group ID in a track-level data structure (a track header box for alternate track groups and a track selection box in a track-level user data box). This entails the parsing of all of the tracks in a movie box in order to obtain the information of alternate or switching track groups. If the number of tracks is great, then the parsing complexity is non-trivial.

SUMMARY OF THE INVENTION

The present invention provides a system and method for signaling and indicating track relationship information in media files. In particular, the present invention provides a mechanism for signaling the information of layered track groups and the information of MDC track groups, as well as a mechanism for signaling track relationship information in an efficient way.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
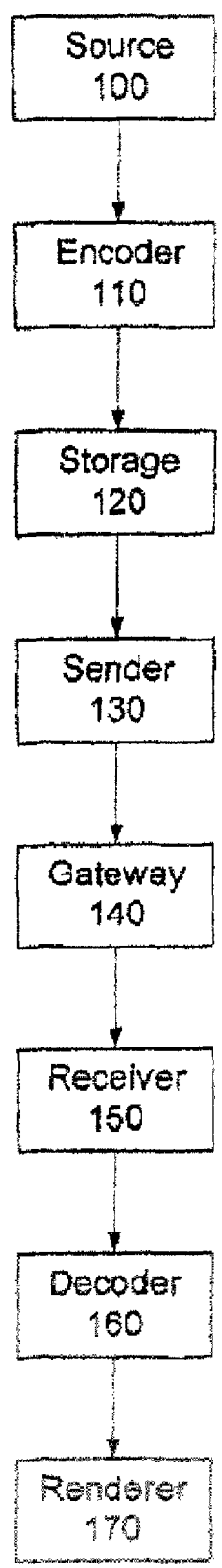
FIG. 1 shows a generic multimedia communications system for use with various embodiments of the present invention.

FIG. 1 shows a generic multimedia communications system for use with the present invention. As shown in FIG. 1, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bit rate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The codec media bitstream is typically processed further by a decoder 160, whose output is one or more uncompressed media streams. Finally, a renderer 170 may reproduce the uncompressed media streams with a loudspeaker or a display, for example. The receiver 150, decoder 160, and renderer 170 may reside in the same physical device or they may be included in separate devices. It should therefore be understood that a bitstream to be decoded can be received from a remote device located within virtually any type of network, as well as from other local hardware or software within the device at issue. It should be also understood that, although text and examples contained herein may specifically describe an encoding process, one skilled in the art would readily understand that the same concepts and principles also apply to the corresponding decoding process and vice versa.

The present invention provides a system and method for signaling and indicating track relationship information in media files. In particular, the present invention provides a mechanism for signaling the information of layered track groups and the information of MDC track groups, as well as a mechanism for signaling track relationship information in an efficient way.

With the present invention, the selection of tracks for local playback or transmission in multimedia applications become simpler relative to conventional arrangements. In local playback or unicast streaming applications, to select an independently decodable track for a certain media type, the information of alternate track groups is first found via the track relation box, and one track is selected from an alternate track group for the media type. If stream switching is desired, the switching track group information can be easily found via the track relation box. In multicast applications with scalable or MDC streams, the tracks in a layered or MDC group can be easily found via the track relation box and selected among all of the layered or MDC groups.

In one embodiment of the present invention, a new box, referred to herein as a track relation box, is defined and specifies the relationship between tracks. The track relation box is defined as follows:

```
Box Type:    'trel'
Container:   Movie Box ('moov')
Mandatory:   No
Quantity:    Zero or One
The syntax for the track relation box is as follows:
aligned(8) class TrackRelationBox
    extends FullBox('trel', version = 0, flags) {
    int i,j,k;
    if(flags & 0x000001 == 1) {
        unsigned int(16) num_alternate_groups;
        for(i=0; i<num_alternatve_groups; i++) {
            int(16) alternate_group_id;
            unsigned int(16) num_tracks_in_alternate_group;
            for(j=0; j<num_tracks_in_alternate_group; j++)
                unsigned int(32) alternate_track_id;
        }
    }
    if(flags & 0x000002 == 1) {
        unsigned int(16) num_switch_groups;
        for(i=0; i<num_switch_groups; i++) {
            int(16) switch_group_id;
            unsigned int(16) num_tracks_in_switch_group;
            for(j=0; j<num_tracks_in_switch_group; j++)
                unsigned int(32) switch_track_id;
        }
    }
    if(flags & 0x000004 == 1) {
        unsigned int(16) num_layered_groups;
        for(i=0; i<num_layered_groups; i++) {
            int(16) layered_group_id;
            unsigned int(16) num_tracks_in_layered_group;
            for(j=0; j<num_tracks_in_layered_group; j++) {
                unsigned int(32) layered_track_id;
                unsigned int(16) num_dependent_on_tracks;
                for(k=0; k<num_layered_on_tracks; k++)
```

-continued

```
        unsigned int(32) dependent_on_track_id;
      }
    }
  }
  if(flags & 0x000008 == 1) {
    unsigned int(16) num_mdc_groups;
    for(i=0; i<num_mdc_groups; i++) {
      int(16) mdc_group_id;
      unsigned int(16) num_tracks_in_mdc_group;
      for(j=0; j<num_tracks_in_mdc_group; j++)
        unsigned int(32) mdc_track_id;
    }
  }
}
```

In the above syntax, "version" is an integer that specifies the version of the track relation box (0 as described above).

"flags" is a 24-bit integer with flags. The following bits are defined, where bit 0 is the least significant bit, bit 1 is the second least significant bit, etc. When bit 0 is equal to 1, this indicates that information of alternate track groups is present in this box. When bit 0 is equal to 0, this indicates that information of alternate track groups is not present in this box.

When bit 1 is equal to 1, this indicates that information of switching track groups is present in this box. When bit 1 is equal to 0, this indicates that information of switching track groups is not present in this box.

When bit 2 is equal to 1, this indicates that information of layered track groups is present in this box. When bit 2 is equal to 0, this indicates that information of layered track groups is not present in this box.

When bit 3 is equal to 1, this indicates that information of MDC track groups is present in this box. When bit 3 is equal to 0, this indicates that information of MDC track groups is not present in this box.

"num_alternate_groups" indicates the number of alternate track groups that are signaled. "alternate_group_id" indicates the identifier of the i-th alternate track group that is signaled. The value is not equal to 0. Any track associated with an alternate_group_id has an alternate_group (in the track header box) equal to the alternate_group_id. Any track having an alternate_group (in the track header box) not equal to 0 is associated with an alternative_group_id. "num_tracks_in_alternate_group" indicates the number of tracks in the i-th alternate track group that is signaled. The "alternate_track_id" indicates the track ID of the j-th track in the i-th alternate track group that is signaled.

"num_switch_groups" indicates the number of switching track groups that are signaled. "switch_group_id" indicates the identifier of the i-th switching track group that is signaled. The value is not equal to 0. For any track associated with a switch_group_id, if a track selection box is present, then the switch_group signaled in the track selection box is equal to the switch_group_id. For any track having a track selection box present, if the alternate_group is not equal to 0, the track shall be associated with a switch_group_id. "num_tracks_in_switch_group" indicates the number of tracks in the i-th switch track group that is signaled. "switch_track_id" indicates the track ID of the j-th track in the i-th switch track group that is signaled.

"num_layered_groups" indicates the number of layered track groups that are signaled. "layered_group_id" indicates the identifier of the i-th layered track group that is signaled. "num_tracks_in_layered_group" indicates the number of tracks in the i-th layered track group that is signaled. "layered_track_id" indicates the track ID of the j-th track in the i-th layered track group that is signaled.

"num_dependent_on_tracks" indicates the number of tracks on which the j-th track in the i-th layered track group is directly or indirectly dependent. "dependent_on_track_id" indicates the track ID of the k-th track on which the j-th track in the i-th layered track group is directly or indirectly dependent.

"num_mdc_groups" indicates the number of MDC track groups that are signaled. "mdc_group_id" indicates the identifier of the i-th MDC track group that is signaled.

"num_tracks_in_mdc_group" indicates the number of tracks in the i-th MDC track group that is signaled. "mdc_track_id" indicates the track ID of the j-th track in the i-th MDC track group that is signaled.

In addition to the above, track relationship information can be presented according to various other embodiments of the present invention. For example, it is possible to signal the information of layered or MDC track groups in the track level. For layered track groups, a layered group ID is signaled in the track header box, in the track-level user data box, or in any other track-level data structure. The situation is similar for MDC track groups. In another embodiment, the track relation box can also be contained in the movie header box or in a movie-level user data box. In still another embodiment, information of different types of track groups can be signaled in separate boxes. Other embodiments in addition to those described herein are also possible.

Figure 2:
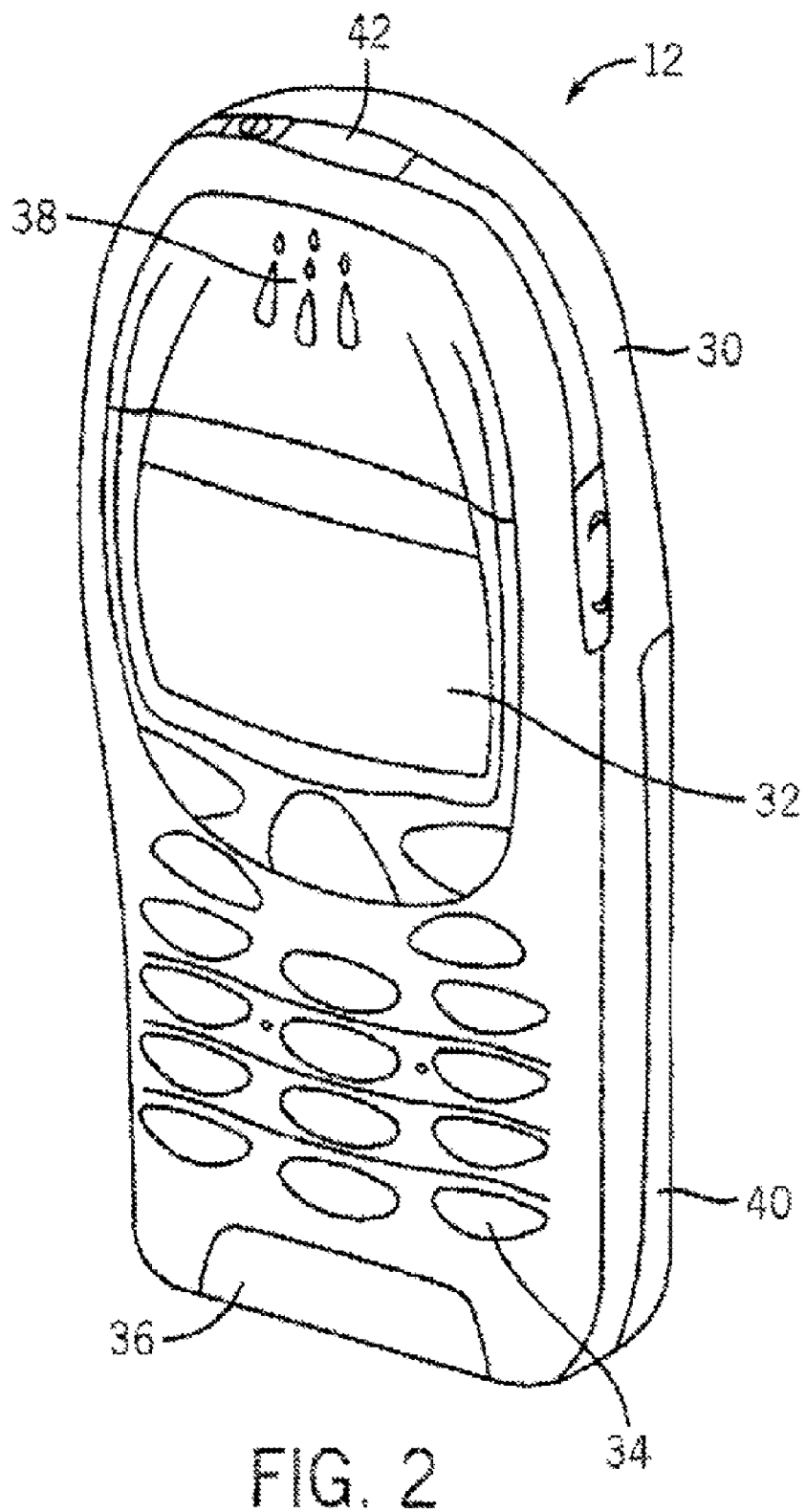
FIG. 2 is a perspective view of a mobile telephone that can be used in the implementation of the present invention.
Figure 3:
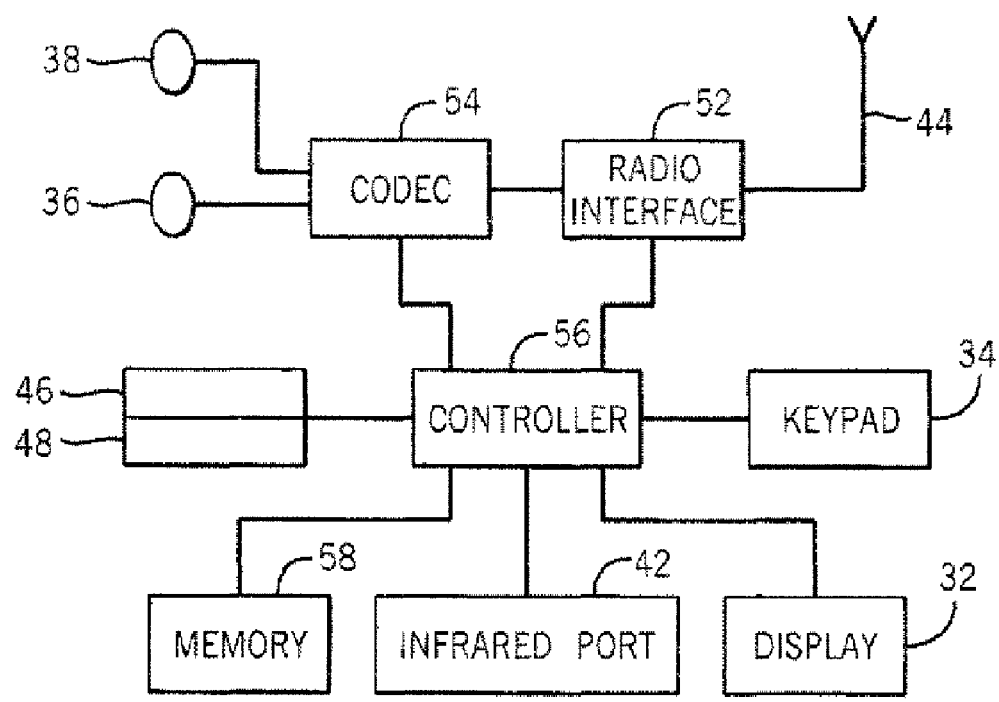
FIG. 3 is a schematic representation of the telephone circuitry of the mobile telephone of FIG. 2.

FIGS. 2 and 3 show one representative electronic device 12 within which the present invention may be implemented. It should be understood, however, that the present invention is not intended to be limited to one particular type of electronic device 12. The electronic device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Communication devices implementing the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of storing coded multimedia content into a container file, comprising:
    including a plurality of tracks into the container file;
    determining track relationship information, the track relationship information identifying multiple description coding (MDC) and group track relationships among the plurality of tracks and
    signaling the track relationship information,
    wherein the track relationship information includes:
        the number of tracks included in each alternate track group; and
        an identifier for each track in each alternate track group.

2. The method of claim 1, wherein the track relationship information is encoded in a track relation box.

3. The method of claim 2, wherein the track relation box includes an indication as to whether information relating to alternate track groups is present in the track relation box.

4. The method of claim 3, wherein, if information relating to alternate track groups is present in the track relation box, the track relation box includes information regarding:
    the number of alternate track groups in the container file,
    an identifier for each alternate track group,
    the number of tracks included in each alternate track group, and
    an identifier for each track in each alternate track group.

5. The method of claim 2, wherein the track relation box includes an indication as to whether information relating to switching track groups is present in the track relation box.

6. The method of claim 5, wherein, if information relating to switching track groups is present in the track relation box, the track relation box includes information regarding:
    the number of switching track groups in the container file,
    an identifier for each switching track group,
    the number of tracks included in each switching track group, and
    an identifiers for each track in each switching track group.

7. The method of claim 2, wherein the track relation box includes an indication as to whether information relating to layered track groups is present in the track relation box.

8. The method of claim 7, wherein, if information relating to layered track groups is present in the track relation box, the track relation box includes information regarding:
    the number of layered track groups in the container file,
    an identifier for each layered track group,
    the number of tracks included in each layered track group,
    an identifier for each track in each layered track group,
    for each track, an indication of the number of other tracks upon which the respective track directly or indirectly depends, and
    for each track, an identification of the other tracks upon which the respective track directly or indirectly depends.

9. The method of claim 2, wherein the track relation box includes an indication as to whether information relating to multiple description coding (MDC) track groups is present in the track relation box.

10. The method of claim 9, wherein, if information relating to MDC track groups is present in the track relation box, the track relation box includes information regarding:
    the number of MDC track groups in the container file,
    an identifier for each MDC track group,
    the number of tracks included in each MDC track group, and
    an identifier for each track in each MDC track group.

11. The method of claim 2, wherein the track relation box is contained within a movie box.

12. The method of claim 2, wherein the track relation box is contained within a movie header box.

13. The method of claim 2, wherein the track relation box is contained within a movie-level user data box container.

14. The method of claim 1, wherein the track relationship information includes information regarding different types of track groups, and wherein the information regarding different types of track groups is encoded in separate boxes.

15. The method of claim 1, wherein the track relationship information includes information regarding layered track groups, the information regarding layered track groups being encoded at the track level.

16. The method of claim 1, wherein the track relationship information includes information regarding multiple description coding (MDC) track groups, the information regarding MDC track groups being encoded at the track level.

17. A computer program product, embodied in a computer-readable medium, for storing coded multimedia content into a container file, comprising:
    computer code for including a plurality of tracks into the container file; and
    computer code for determining track relationship information, the track relationship information identifying multiple description coding (MDC) and group track relationships among the plurality of tracks; and
    computer code for signaling the track relationship information,
    wherein the track relationship information includes:
        the number of tracks included in each alternate track group; and
        an identifier for each track in each alternate track group.

18. An apparatus, comprising:
    a processor; and
    a memory unit communicatively connected to the processor and including:
        computer code for including a plurality of tracks into the container file;
        computer code for determining track relationship information, the track relationship information identifying multiple description coding (MDC) and group track relationships among the plurality of tracks; and
        computer code for signaling the track relationship information,
        wherein the track relationship information includes:

the number of tracks included in each alternate track group; and
an identifier for each track in each alternate track group.

19. The apparatus of claim 18, wherein the track relationship information is encoded in a track relation box.

20. The apparatus of claim 19, wherein the track relation box includes an indication as to whether information relating to alternate track groups is present in the track relation box.

21. The apparatus of claim 20, wherein, if information relating to alternate track groups is present in the track relation box, the track relation box includes information regarding:
the number of alternate track groups in the container file,
an identifier for each alternate track group,
the number of tracks included in each alternate track group, and
an identifier for each track in each alternate track group.

22. The apparatus of claim 19, wherein the track relation box includes an indication as to whether information relating to switching track groups is present in the track relation box.

23. The apparatus of claim 22, wherein, if information relating to switching track groups is present in the track relation box, the track relation box includes information regarding:
the number of switching track groups in the container file,
an identifier for each switching track group,
the number of tracks included in each switching track group, and
an identifiers for each track in each switching track group.

24. The apparatus of claim 19, wherein the track relation box includes an indication as to whether information relating to layered track groups is present in the track relation box.

25. The apparatus of claim 24, wherein, if information relating to layered track groups is present in the track relation box, the track relation box includes information regarding:
the number of layered track groups in the container file,
an identifier for each layered track group,
the number of tracks included in each layered track group,
an identifier for each track in each layered track group,
for each track, an indication of the number of other tracks upon which the respective track directly or indirectly depends, and
for each track, an identification of the other tracks upon which the respective track directly or indirectly depends.

26. The apparatus of claim 19, wherein the track relation box includes an indication as to whether information relating to multiple description coding (MDC) track groups is present in the track relation box.

27. The apparatus of claim 26, wherein, if information relating to MDC track groups is present in the track relation box, the track relation box includes information regarding:
the number of MDC track groups in the container file,
an identifier for each MDC track group,
the number of tracks included in each MDC track group, and
an identifier for each track in each MDC track group.

28. The apparatus of claim 19, wherein the track relation box is contained within a movie box.

29. The apparatus of claim 19, wherein the track relation box is contained within a movie header box.

30. The apparatus of claim 19, wherein the track relation box is contained within a movie-level user data box container.

31. The apparatus of claim 18, wherein the track relationship information includes information regarding different types of track groups, and wherein the information regarding different types of track groups is encoded in separate boxes.

32. The apparatus of claim 18, wherein the track relationship information includes information regarding layered track groups, the information regarding layered track groups being encoded at the track level.

33. The apparatus of claim 18, wherein the track relationship information includes information regarding multiple description coding (MDC) track groups, the information regarding MDC track groups being encoded at the track level.

34. A method of storing coded multimedia content into a container file, comprising:
including a plurality of tracks into the container file;
determining track relationship information, the track relationship information identifying relationships among the plurality of tracks; and
signaling the track relationship information at a presentation or movie level,
wherein the track relationship information includes:
the number of tracks included in each alternate track group; and
an identifier for each track in each alternate track group.

35. A computer program product, embodied in a computer-readable medium, for storing coded multimedia content into a container file, comprising:
computer code for including a plurality of tracks into the container file; and
computer code for determining track relationship information, the track relationship information identifying relationships among the plurality of tracks; and
computer code for signaling the track relationship information at a presentation or movie level,
wherein the track relationship information includes:
the number of tracks included in each alternate track group; and
an identifier for each track in each alternate track group.

36. An apparatus, comprising:
a processor; and
a memory unit communicatively connected to the processor and including:
computer code for including a plurality of tracks into the container file; and
computer code for determining track relationship information, the track relationship information identifying relationships among the plurality of tracks; and
computer code for signaling the track relationship information at a presentation or movie level,
wherein the track relationship information includes:
the number of tracks included in each alternate track group; and
an identifier for each track in each alternate track group.

37. A method of parsing coded multimedia content from a container file, comprising:
parsing signaled track relationship information, the track relationship information identifying multiple description coding (MDC) and group track relationships among a plurality of tracks; and
parsing the plurality of tracks from the container file in accordance with the parsed track relationship information
wherein the track relationship information includes:
the number of tracks included in each alternate track group; and
an identifier for each track in each alternate track group.

38. The method of claim 37, wherein the track relationship information is encoded in a track relation box.

39. The method of claim 38, wherein the track relation box includes an indication as to whether information relating to alternate track groups is present in the track relation box.

40. The method of claim 39, wherein, if information relating to alternate track groups is present in the track relation box, the track relation box includes information regarding:
the number of alternate track groups in the container file,
an identifier for each alternate track group,
the number of tracks included in each alternate track group, and
an identifier for each track in each alternate track group.

41. The method of claim 38, wherein the track relation box includes an indication as to whether information relating to switching track groups is present in the track relation box.

42. The method of claim 41, wherein, if information relating to switching track groups is present in the track relation box, the track relation box includes information regarding:
the number of switching track groups in the container file,
an identifier for each switching track group,
the number of tracks included in each switching track group, and
an identifiers for each track in each switching track group.

43. The method of claim 38, wherein the track relation box includes an indication as to whether information relating to layered track groups is present in the track relation box.

44. The method of claim 43, wherein, if information relating to layered track groups is present in the track relation box, the track relation box includes information regarding:
the number of layered track groups in the container file,
an identifier for each layered track group,
the number of tracks included in each layered track group,
an identifier for each track in each layered track group,
for each track, an indication of the number of other tracks upon which the respective track directly or indirectly depends, and
for each track, an identification of the other tracks upon which the respective track directly or indirectly depends.

45. The method of claim 38, wherein the track relation box includes an indication as to whether information relating to multiple description coding (MDC) track groups is present in the track relation box.

46. The method of claim 45, wherein, if information relating to MDC track groups is present in the track relation box, the track relation box includes information regarding:
the number of MDC track groups in the container file,
an identifier for each MDC track group,
the number of tracks included in each MDC track group, and
an identifier for each track in each MDC track group.

47. The method of claim 38, wherein the track relation box is contained within a movie box.

48. The method of claim 38, wherein the track relation box is contained within a movie header box.

49. The method of claim 38, wherein the track relation box is contained within a movie-level user data box container.

50. The method of claim 37, wherein the track relationship information includes information regarding different types of track groups, and wherein the information regarding different types of track groups is encoded in separate boxes.

51. The method of claim 37, wherein the track relationship information includes information regarding layered track groups, the information regarding layered track groups being encoded at the track level.

52. The method of claim 37, wherein the track relationship information includes information regarding multiple description coding (MDC) track groups, the information regarding MDC track groups being encoded at the track level.

53. A computer program product, embodied in a computer-readable medium, for parsing coded multimedia content from a container file, comprising:
computer code for parsing signaled track relationship information, the track relationship information identifying multiple description coding (MDC) and group track relationships among a plurality of tracks; and
computer code for parsing the plurality of tracks from the container file in accordance with the parsed track relationship information,
wherein the track relationship information includes:
the number of tracks included in each alternate track group; and
an identifier for each track in each alternate track group.

54. An apparatus, comprising:
a processor; and
a memory unit communicatively connected to the processor and including:
computer code for parsing signaled track relationship information, the track relationship information identifying multiple description coding (MDC) and group track relationships among a plurality of tracks; and
computer code for parsing the plurality of tracks from the container file in accordance with the parsed track relationship information,
wherein the track relationship information includes:
the number of tracks included in each alternate track group; and
an identifier for each track in each alternate track group.

55. The apparatus of claim 54, wherein the track relationship information is encoded in a track relation box.

56. The apparatus of claim 55, wherein the track relation box includes an indication as to whether information relating to alternate track groups is present in the track relation box.

57. The apparatus of claim 56, wherein, if information relating to alternate track groups is present in the track relation box, the track relation box includes information regarding:
the number of alternate track groups in the container file,
an identifier for each alternate track group,
the number of tracks included in each alternate track group, and
an identifier for each track in each alternate track group.

58. The apparatus of claim 55, wherein the track relation box includes an indication as to whether information relating to switching track groups is present in the track relation box.

59. The apparatus of claim 58, wherein, if information relating to switching track groups is present in the track relation box, the track relation box includes information regarding:
the number of switching track groups in the container file,
an identifier for each switching track group,
the number of tracks included in each switching track group, and
an identifiers for each track in each switching track group.

60. The apparatus of claim 55, wherein the track relation box includes an indication as to whether information relating to layered track groups is present in the track relation box.

61. The apparatus of claim 60, wherein, if information relating to layered track groups is present in the track relation box, the track relation box includes information regarding:
the number of layered track groups in the container file,
an identifier for each layered track group,
the number of tracks included in each layered track group,
an identifier for each track in each layered track group,
for each track, an indication of the number of other tracks upon which the respective track directly or indirectly depends, and for each track, an identification of the other tracks upon which the respective track directly or indirectly depends.

62. The apparatus of claim 55, wherein the track relation box includes an indication as to whether information relating to multiple description coding (MDC) track groups is present in the track relation box.

63. The apparatus of claim 62, wherein, if information relating to MDC track groups is present in the track relation box, the track relation box includes information regarding:
the number of MDC track groups in the container file,
an identifier for each MDC track group,
the number of tracks included in each MDC track group, and
an identifier for each track in each MDC track group.

64. The apparatus of claim 55, wherein the track relation box is contained within a movie box.

65. The apparatus of claim 55, wherein the track relation box is contained within a movie header box.

66. The apparatus of claim 55, wherein the track relation box is contained within a movie-level user data box container.

67. The apparatus of claim 54, wherein the track relationship information includes information regarding different types of track groups, and wherein the information regarding different types of track groups is encoded in separate boxes.

68. The apparatus of claim 54, wherein the track relationship information includes information regarding layered track groups, the information regarding layered track groups being encoded at the track level.

69. The apparatus of claim 54, wherein the track relationship information includes information regarding multiple description coding (MDC) track groups, the information regarding MDC track groups being encoded at the track level.

70. A method of parsing coded multimedia content from a container file, comprising:
parsing signaled track relationship information at a presentation or movie level, the track relationship information identifying relationships among a plurality of tracks; and
parsing the plurality of tracks from the container file in accordance with the parsed track relationship information
wherein the track relationship information includes:
the number of tracks included in each alternate track group; and
an identifier for each track in each alternate track group.

71. A computer program product, embodied in a computer-readable medium, for parsing coded multimedia content from a container file, comprising:
computer code for parsing signaled track relationship information at a presentation or movie level, the track relationship information identifying relationships among a plurality of tracks; and
computer code for parsing the plurality of tracks from the container file in accordance with the parsed track relationship information,
wherein the track relationship information includes:
the number of tracks included in each alternate track group; and
an identifier for each track in each alternate track group.

72. An apparatus, comprising:
a processor; and
a memory unit communicatively connected to the processor and including:
computer code for parsing signaled track relationship information at a presentation or movie level, the track relationship information identifying relationships among a plurality of tracks; and
computer code for parsing the plurality of tracks from the container file in accordance with the parsed track relationship information,
wherein the track relationship information includes:
the number of tracks included in each alternate track group; and
an identifier for each track in each alternate track group.

73. A computer-readable medium having embodied therein a container file, the container file comprising:
a plurality of tracks, and
signaled track relationship information, the track relationship information identifying multiple description coding (MDC) and group track relationships among the plurality of tracks,
wherein the track relationship information includes:
the number of tracks included in each alternate track group; and
an identifier for each track in each alternate track group.

74. A computer-readable medium having embodied therein a container file, the container file comprising:
a plurality of tracks, and
signaled track relationship information at a presentation or movie level, the track relationship information identifying relationships among the plurality of tracks,
wherein the track relationship information includes:
the number of tracks included in each alternate track group; and
an identifier for each track in each alternate track group.

* * * * *